May 11, 1954    G. L. BROOMELL, JR., ET AL    2,678,422
ELECTRICAL MEASURING SYSTEM

Filed July 1, 1950          3 Sheets-Sheet 1

INVENTORS.
GEORGE L. BROOMELL, JR.
BY CHARLES E. MILLER

*Woodcock and Phelan*

ATTORNEYS

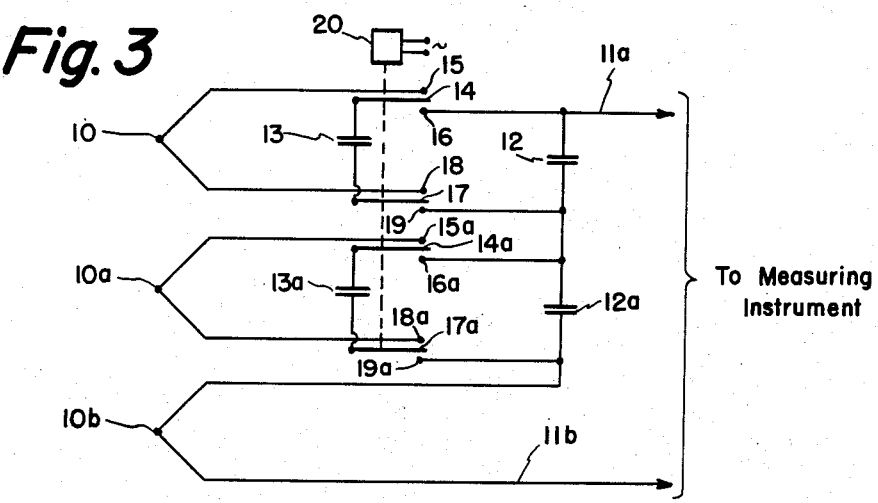
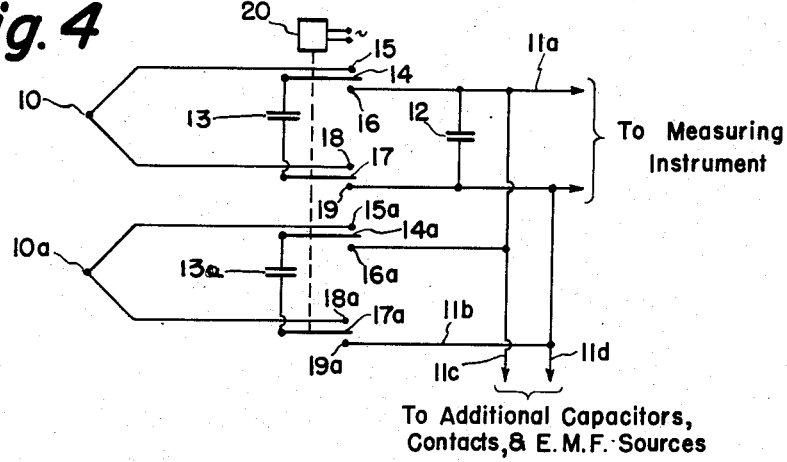

Patented May 11, 1954

2,678,422

UNITED STATES PATENT OFFICE 2,678,422

ELECTRICAL MEASURING SYSTEM

George L. Broomell, Jr., Lower Gwynedd Township, Montgomery County, and Charles E. Miller, Glenside, Pa., assignors to Leeds and Northrup Company, Philadelphia, Pa., a corporation of Pennsylvania Application July 1, 1950, Serial No. 171,738

10 Claims. (Cl. 324—99)

This invention relates to electrical systems for the measurement of the magnitude of a condition, as the quantitative variations in electrical, chemical or physical properties under measurement, and has for an object the provision of a device for the measurement of small voltages or currents with high precision notwithstanding the circuits including such voltages or currents may have random and unpredictable connections to ground and may be subject to electrical disturbances of many kinds.

The present invention is particularly applicable to measurements of the magnitude of a selected condition associated with heavy industrial equipment such as the temperature of a furnace of the arc or induction type. In such furnaces, there are present circulating currents other than in the heating circuit and voltage gradients exist which may change from time to time. Because of such gradients, a measuring device such as a thermocouple is likely to be at a potential materially above that of ground and may be deliberately attached to a circuit whose potential is materially above ground. Because of the unpredicted nature of the current paths and the change of the voltage gradients, use of a measuring circuit dependent upon variation in a low level source of voltage in accordance with variation of the condition under measurement offers substantial difficulty, particularly if there is to be avoided the unwanted voltages which introduce error into the measurement. Such voltages are particularly bothersome when the more accurate null point method is utilized as by the provision of self-balancing instruments.

In accordance with the present invention the circuit including the voltage of the condition-responsive device, such as a thermocouple, is at all times isolated from the measuring instrument, thus maintaining that instrument free from all stray currents and voltages affecting the thermocouple circuit and which would otherwise adversely affect its operation in the null measurement of the thermocouple voltage.

More particularly, there is provided in accordance with the invention an electrostatic storage device such as a capacitor which is intermittently connected to the circuit including a source of voltage, as the thermocouple to be measured. After disconnection from that circuit, the capacitor is connected to another electrostatic storage device which may also be a capacitor, the latter being connected in the balanceable measuring network. The network includes a source of known voltage which may be adjusted to have a value equal in magnitude to the voltage impressed on the capacitor fixedly connected in the measuring network and of like polarity for null measurement of the potential of that capacitor. Since the magnitude of the voltage across the capacitor and the measuring circuit has a value always related to that of the capacitor which is intermittently connected to the thermocouple, the null measurement will always be representative of the temperatures at which the thermocouple or other condition-responsive device has been subjected. Thus, it will be seen that the measurement of the condition is achieved in the absence of any conductive circuit connection between the condition-responsive device and the measuring network. Accordingly, the measuring or balanceable network is isolated from the circuit including the voltage to be measured and yet functions to measure the voltage intermittently applied to the capacitor therein which is maintained at a value corresponding with that produced by the condition-responsive device. The operation of the balanceable network is thus the same as though it were connected to the unidirectional condition-responsive device which, as already suggested, may be a thermocouple.

The invention lends itself to the measurement of average values, weighted averages, and differential values, derived as may be desired from a plurality of voltage sources, the features of the invention being particularly applicable to avoid inaccuracies due to the extraneous voltages referred to above.

For a more detailed description of the invention and for further objects and advantages thereof, reference may be had to the following description together with the accompanying drawings, in which:

Fig. 1 diagrammatically illustrates a measuring system utilizing the invention;

Fig. 2 diagrammatically illustrates a measuring system similar to Fig. 1 but including two condition-responsive devices and an electrical measuring instrument of a different type;

Fig. 3 illustrates a further application of the invention to measurements from a plurality of voltage sources;

Fig. 4 illustrates another embodiment of the invention for a plurality of voltage sources.

Figure 1:
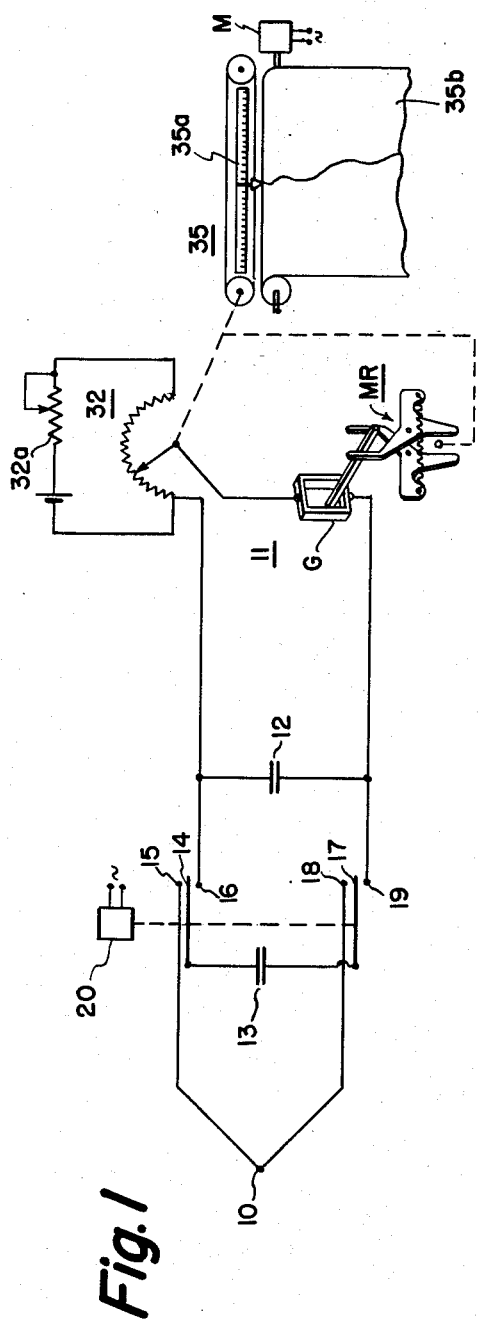

Referring to the drawings, the invention in one form has been shown as applied to the measurement of the magnitude of a condition, such as temperature, a thermocouple 10 being illustrated for that purpose. The thermocouple 10, exposed to the temperature to be measured, produces a potential difference indicative thereof and which is relatively small. Thus, a sensitive system is required for accurate measurement of changes in the thermocouple voltage. To avoid the effect of the stray currents and variable voltage gradients above referred to, the circuit including the thermocouple 10 is intermittently connected to an electrostatic storage means shown in the form of capacitor 13 by means of the periodic engagement of stationary contacts 15 and 18 by movable contacts 14 and 17. The contacts 14 and 17 may be driven in any suitable manner as by an operating coil 20 energized from a suitable alternating current source of supply. Each time the storage means 13 is connected to the thermocouple circuit, its electrical charge is changed to produce a potential difference corresponding with any change which may have occurred in the electromotive force of the thermocouple. Thus, the potential difference of capacitor 13 is representative of the temperature under measurement. The movable contacts 14 and 17 are operated intermittently to disconnect capacitor 13 from the thermocouple circuit and through stationary contacts 16 and 19 to connect the storage device 13 to another electrostatic storage means shown as capacitor 12. The capacitor 13 then shares its charge with capacitor 12. Thus, the potential difference across capacitor 12 is always related to the potential difference of capacitor 13. After sharing its charge with capacitor 12, the capacitor 13 is again connected to the thermocouple circuit, and if there has been a change in the electromotive force of the thermocouple, the charge on the capacitor 13 will be changed accordingly, and will thus produce a corresponding change on the charge of capacitor 12 when it is next connected in parallel with it.

The capacitor 12 is connected in a balanceable measuring circuit including a known source of voltage 32 shown in the form of a potentiometer including a slidewire having an adjustable contact for varying the fraction of voltage or reference voltage which is opposed to the input voltage or potential difference across capacitor 12. In the form of the invention shown in Fig. 1, the known voltage source or potentiometer 32 forms a part of a measuring instrument which by means of galvanometer G and a mechanical relay MR serves relatively to adjust the slidewire and its associated contact to balance the measuring circuit for null measurement of the potential difference across capacitor 12. Thus, variations in temperature to which the thermocouple 10 is subjected may be read directly on a scale 35a and recorded upon a chart 35b driven by motor M to provide a time-base graph and forming the exhibiting part 35 of the instrument 11. The measuring instrument 11 as a whole is preferably of the type disclosed in Patent 1,935,732 issued to Lloyd Y. Squibb, and reference may be had thereto for further details of construction and operation, those skilled in the art being familiar with the aforesaid type of instrument.

The vibrator coil 20 may actuate its movable contacts either synchronously with respect to its source of supply, or asynchronously, it being unimportant to the present invention which mode of operation be selected or what the speed of operation of the vibrator shall be. However, it is desired that the vibrator be operated to make the circuit-transfer operations at a rate which will result in the prompt reflection in the charge on capacitor 12 of any variations in the electromotive force of thermocouple 10.

By providing a vibrator of the double-pole, double-throw type, the thermocouple circuit is at all times bodily or conductively isolated from all parts of the measuring network. While the illustrated arrangement is essential to the elimination of the effect of stray voltages and currents upon the thermocouple circuit, for some applications, one of the contacts of the vibrator may be omitted, the two circuits then being in part conductively connected together, an example of such a circuit being disclosed and claimed in concurrently filed application Serial No. 171,735 by James B. Carolus, a coemployee of ours.

It is also to be observed that in the system of Fig. 1 the provision of the capacitor 12 on which there is maintained a potential difference related to or corresponding with that of thermocouple 10, the type of measuring instrument need not be as illustrated since any suitable form of measuring instrument may be utilized, such as a vacuum tube voltmeter. The potentiometer slidewire may be manually operated, or a measuring instrument of the type known on the market under the trade-mark "Speedomax," disclosures of which will be found in Williams Patents Nos. 2,113,164 and 2,367,746, may be utilized. With any selected measuring instrument, the foregoing advantages of the invention are realized and in the case of the instrument 11 diagrammatically illustrated in Fig. 1 and sold on the market under the trade-mark "Micromax," the circuit arrangement is particularly useful in maintaining a unidirectional potential on capacitor 12 which is connected in series in the galvanometer circuit and with the slidewire of the potentiometer 32.

Figure 2:
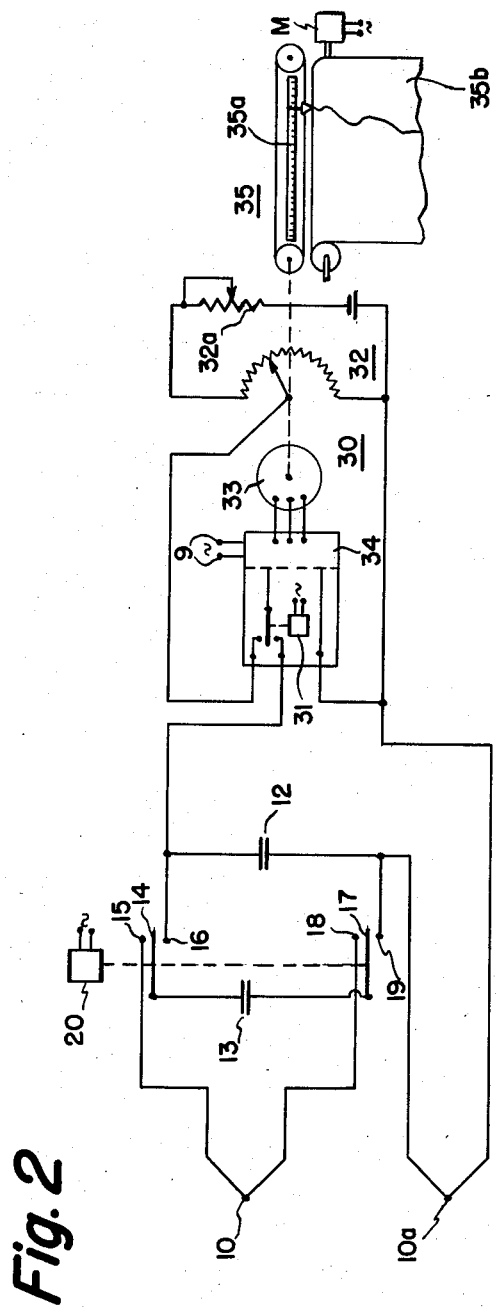

The system of Figs. 1 and 2 are null systems. In Fig. 2, since the potentiometer 32 is continuously adjusted to maintain the fraction of its voltage in the measuring circuit, i. e. reference voltage, equal to the sum of the potential differences across capacitor 12 and thermocouple 10a, i. e. input voltage, no circulating current flows therein.

Further in connection with Fig. 2, it is to be understood that a temperature differential can be measured by connecting thermocouples 10 and 10a in series-opposition, the resistor 32a then being properly set so that scale 35a can be read in terms of temperature difference to which the thermocouples 10a and 10b may be subjected. Chart 35b is driven by motor M as described.

The size of the capacitors 12 and 13 is not critical. They may be selected for particular applications and may vary as from 50 microfarads to 1000 microfarads and capacitors smaller and larger may also be utilized. In typical embodiments of the invention, as in systems like those of Figs. 1 and 2, electrolytic capacitors of 1000 microfarads were used for both capacitors 12 and 13 and paper capacitors of 50 microfarads were also used. Capacitor 13 in one embodiment had a capacity of 1000 microfarads while capacitor 12 was half that size. Thus, it will be seen that the requirement for the capacitors 12 and 13 is that they shall be large enough to receive and maintain a charge from the condition-responsive device to which they are connected while providing the energy required for the needed response of the measuring instrument.

The invention is particularly applicable to applications where it is desired to obtain the average of two measurements of the magnitude of a condition, such as to obtain a measure of the average of the temperatures to which two thermocouples may be subjected. While average temperatures have heretofore been directly measured with either series connections (Cary Patent No. 1,494,586) or parallel connections (Wunsch Patent No. 1,985,967), accidental grounding of the thermocouples, as sometimes occurs in the installation of the thermocouples, may effectively short-circuit one or more of them.

In accordance with one form of the invention illustrated in Fig. 2, an average measurement of the temperatures to which thermocouples 10 and 10a may be subjected is attained regardless of ground connections to the thermocouples and irrespective of whether either side of either thermocouple is grounded. More particularly, it will be seen that thermocouple 10 is connected by the movable contacts 14 and 17 of the vibrator in manner already described in connection with Fig. 1 so that its electromotive force is intermittently applied to the capacitor 12 which attains a potential difference related to or corresponding with that of the electromotive force of thermocouple 10. A second thermocouple 10a is connected in series in the measuring circuit; that is, in series with capacitor 12 so that the electromotive force developed by the thermocouple 10a is cumulative with the potential difference across capacitor 12. The sum of their potential differences is applied to the input circuit of a measurement instrument 30 of the type disclosed in said Williams patents and which includes a synchronous vibrator 31 connected to an amplifier 34. An alternating current output from the amplifier 34 in conjunction with connections from a suitable source of alternating current supply indicated by the supply terminals 9, controls the energization of motor 33 to adjust the slidewire of potentiometer 32 to vary the known value of the voltage developed thereby to equal the sum of the potential difference across capacitor 12 and that developed by thermocouple 10a.

With a scale 35a calibrated for the temperature range to which one of the thermocouples 10 and 10a is subjected, a variable resistor 32a of the potentiometer is adjusted so that relative movement between the slidewire and its contact will develop twice the voltage as in Fig. 1 for equal changes in angular position thereof.

It will be seen that thermocouple 10a is never conductively connected to any part of the circuit including thermocouple 10. Hence, the existence of any ground connections in either or both circuits cannot affect the voltage output of either condition-responsive device. Nevertheless, the electromotive force developed by thermocouple 10, by reason of the fact that the potential difference across capacitor 12 is always in correspondence with the electromotive force developed by thermocouple 10, is in the measuring circuit added to that of thermocouple 10a.

While the vibrator including the contacts 14 and 17 may be of the synchronous type, it need not be nor need the contacts 14 and 17 have equal closure times with respect to their associated stationary contacts. The adjustment of the relative positions of the movable contacts 14 and 17 is not critical so long as both function together for short periods of circuit-transferring operations. In accordance with the present invention, variation in the closure times of the vibrator does not introduce error into the measurement even though the thermocouples be subjected to materially different temperatures and hence produce unequal voltages. There is also avoided error due to unequal resistance as between the two thermocouple circuits. Moreover, in accordance with the present invention there may be provided a failsafe device which will be effective upon failure of either or both of thermocouples 10 and 10a even though the two are never continuously connected together.

More particularly, the vibrator maintains on the capacitor 12 a charge which is maintained in equilibrium with the charge on capacitor 13, both being determined by the magnitude of one thermocouple voltage. The capacitor 12 provides a continuous unidirectional potential difference in the measuring circuit, which potential difference is maintained while the vibrator contacts move to apply the potential of thermocouple 10 to capacitor 13. The periodic operation of the contacts 14 and 17 occurs with sufficiently high periodicity to maintain the thermocouple voltage and charge on capacitor 13 in equilibrium with that of capacitor 12. Variations in the contact closure time have no practical effect on performance.

In the circuit of Fig. 3, it is to be understood that one of the thermocouples of the series need not be conductively connected to the measuring circuit including conductors 11a and 11b, but may itself be connected to its own capacitor arrangement in the circuit in the same way as capacitors 12 and 12a for thermocouples 10 and 10a, the vibrator having additional contacts performing the circuit-transferring operations already described.

The modification of Fig. 3 may also be utilized for the measurement of temperature differential by connecting thermocouples 10 and 10a with polarities thereof relatively reversed with respect to capacitors 13 and 13a for application of opposed voltages in the measuring network by their associated capacitors 12 and 12a. For such a differential measurement, the thermocouple 10b would be omitted and conductor 11b would be connected directly to the conductor leading to stationary contact 19a.

As shown in Fig. 3, the invention also lends itself to applications where it is desired to directly obtain an arithmetic average of the response of more than two condition-responsive devices such as thermocouples 10, 10a and 10b. This is readily accomplished by providing capacitor 13a, associated with thermocouple 10a, and intermittently connected by contacts 14a and 17a of the vibrator, first at thermocouple 10a and then across a capacitor 12a which, it will be observed is connected in series with capacitor 12 associated with capacitor 13. The third thermocouple 10b in the measuring circuit is connected in series with capacitors 12 and 12a, the measuring instrument connected to conductors 11a and 11b having a range determined by the setting of range resistor 32a, Fig. 2. The range of the instrument for the modification of Fig. 3 will correspond with the range of the sum of the voltages of capacitors 12, 12a and of thermocouple 10b. However, the scale of the instrument will be the same as in Figs. 1 and 2; hence, it will indicate the arithmetic average of the temperatures to which the thermocouples 10, 10a and 10b may be subjected.

In manner similar to that disclosed in Figs. 3 and 4, the invention may be applied to the determination of the arithmetical average of the temperatures to which any number of thermocouples may be subjected.

Again referring to Fig. 4, the two thermocouples 10 and 10a are disclosed as associated with a single capacitor 12, the connection to the measuring instrument again being by way of conductors 11a and 11b. The contacts of the vibrator operate as described in connection with Fig. 3, but in Fig. 4 it will be observed that the capacitor 13a is intermittently connected in parallel with the capacitor 12. Preferably, the vibrator contacts 14, 17, 14a and 17a simultaneously connect capacitors 13 and 13a in parallel with each other and with capacitor 12. In this manner the potential developed by capacitor 12 very quickly approaches the arithmetic average of the electromotive forces of thermocouples 10 and 10a. Additional thermocouples, together with their associated capacitors and vibrator contacts, may be connected to leads 11c and 11d and thus aid in determining the potential of capacitor 12. While in Fig. 3 the capacitors 13 and 13a need not be of equal size, a difference in the size of the capacitors 13 and 13a in Fig. 4 will change the response of the system. If a strict arithmetical average is desired, capacitors 13 and 13a should be of equal size. However, by making capacitors 13 and 13a of different size, weighted arithmetical averages may be readily attained. Thus, by selecting a smaller capacitance for capacitor 13 than for capacitor 13a, the potential of thermocouple 10a will contribute to a greater degree in determining the potential of capacitor 12 than will the potential of thermocouple 10 as transferred to capacitor 12 by way of the capacitor 13 of lesser size.

In the modification of Fig. 4, it will be observed that the potential developed by capacitor 12 will be of the same order as that of thermocouples 10 and 10a. Hence, the measuring instrument will have the same setting of range resistor 32a as for the measurement of temperature of a single thermocouple. This is sometimes of advantage, particularly where it is desired individually to read temperatures of individual thermocouples as well as to determine the average, or weighted averages, of a plurality of them.

Figure 5:
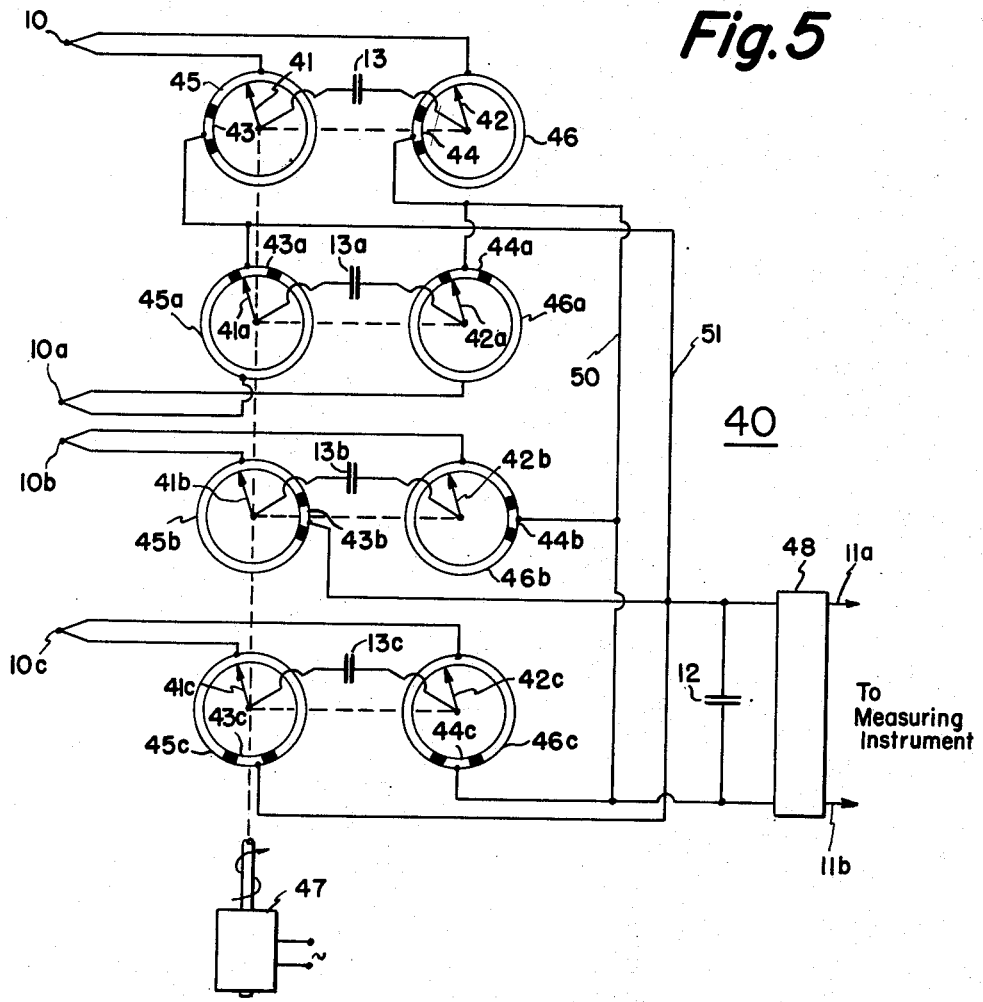
Fig. 5 diagrammatically illustrates still another embodiment for a plurality of voltage sources.

In Fig. 5 there has been illustrated a further modification of the invention which includes the advantages of both Figs. 3 and 4, namely, that a single capacitor 12 is connected to the measuring instrument as by conductors 11a and 11b, a filter 48 being included in the circuit 40, if desired. In the arrangement of Fig. 5, the several capacitors associated with the plurality of voltage sources need not be the same size in order to develop across capacitor 12 a substantially exact arithmetical average of the respective voltages. The several capacitors 13–13c widely differ in capacitance without introducing errors of any great magnitude in the arithmetical average. Capacitors having capacitances ranging from 75% to 125% of the average value may be used, with capacitor 12 one-quarter of said average capacitance value, without introducing errors into the measurement greater than 2% of the quantities measured. In Fig. 5 there is provided for each source of voltage, such as thermocouples 10, 10a, 10b and 10c, the associated capacitors, such as 13, 13a, 13b and 13c together with circuit-controlling devices shown as comprising relatively rotatable contacts and associated contact elements. The rotatable elements have been illustrated as driven by motor 47 by mechanical connections indicated by the broken lines leading to the pivotal axes of each of the rotatable contacts 41, 42, 41a, 42a, 41b, 42b, 41c and 42c. In Fig. 5, clockwise rotation of all parts has been assumed as indicated by the arrow. As shown, contacts 41a and 42a are in engagement with conducting segments 43a and 44a which are connected by way of conductors 50 and 51 to the opposite sides of capacitor 12. Thus, capacitors 13a and 12 will share their charges until contacts 41a and 42a are moved beyond conducting segments 43a and 44a whereupon contacts 41b and 42b engage their associated conducting segments 43b and 44b to connect capacitor 13b across capacitor 12. Due to the disposition of conducting segments 43b and 44b displaced 90 degrees from segments 43a and 44a, the transfer is not made until a somewhat later time, that is, until contacts 41b and 42b do engage their segments 43b and 44b. Meanwhile, contacts 41a and 42a have been rotated to engage contacts 45a and 46a to connect capacitor 13a to thermocouple 10a, where it remains connected until the next cycle of operations. In a similar manner, contacts 41c and 42c connect the capacitor 13c across capacitor 12 followed by the connection of capacitor 13 across capacitor 12 by engagement of contacts 41 and 42 with contact segments 43 and 44. The capacitors 13, 13b and 13c are, of course, connected to their respective thermocouples 10, 10b and 10c after their respective disconnection from capacitor 12. The system repeats the foregoing cycle and capacitors 13, 13a, 13b and 13c are in succession connected across capacitor 12, and thereafter individually and by separate contacts of the circuit-controller driven by motor 47 connected to each corresponding thermocouple.

While preferred embodiments of the invention have been disclosed, it will be obvious to those skilled in the art that additional modifications may be made within the spirit and scope of the appended claims.

What is claimed is:

1. A measuring system comprising a plurality of voltage sources of magnitude representative of a corresponding plurality of conditions, a plurality of electrostatic storage devices, an electrical instrument in series-circuit with at least one of said electrostatic storage devices and in series-circuit with one of said plurality of voltage sources and a known voltage and adapted to vary said known voltage to be equal in magnitude to and of the same polarity as the combined voltage across said last-named electrostatic storage device and said one of said plurality of said voltage sources, and contacting means connected to at least one other of said electrostatic storage devices and adapted to transfer voltages from at least one other of said plurality of said voltage sources to said electrostatic storage device in series-circuit with said electrical instrument.

2. A measuring system for determining the average magnitude of a plurality of unknown voltages comprising an electrical instrument adapted to adjust a reference voltage to equality with an input voltage, a first capacitor, a second capacitor, vibratory contact means connected to said second capacitor alternately to switch said second capacitor from a source of one of said unknown voltages to said first capacitor thereby to charge said first capacitor to a voltage proportional to said one of said unknown voltages and of the same polarity as said reference voltage, said input voltage being derived from a series-circuit including said first capacitor and a source of a second of said unknown voltages, and connections for applying said reference and said input voltages with like poling to said instrument whereupon said instrument adjusts said reference voltage to equality with said input voltage to provide a measure representative of the average magnitude of said plurality of unknown voltages.

3. A measuring system according to claim 2 in which said reference and input voltages are alternately applied with like poling to said electrical instrument.

4. Apparatus for measuring a selected relation between the magnitudes of a plurality of conditions comprising a measuring circuit including in series electrostatic storage means, a source of voltage corresponding to the magnitude of one of said plurality of conditions, a source of known voltage and an unbalance detector, said unbalance detector including means operable in response to a difference between the known voltage and the combination of the voltage across said storage means and said voltage corresponding to the magnitude of said one of said plurality of conditions for adjusting to zero said difference, said electrostatic storage means, circuit means in which there are developed voltages representative of the other of said plurality of conditions, and means alternately connecting said second storage means to said circuit means and to said first-named storage means to vary the potential thereof in accordance with change in said selected relation between said magnitudes of said conditions.

5. Apparatus for measuring a selected relation between the magnitudes of a plurality of conditions comprising a measuring circuit including in series electrostatic storage means, a source of voltage corresponding to the magnitude of one of said plurality of conditions, a source of known voltage and an unbalance detector, said unbalance detector including means operable in response to a difference between the known voltage and a combination of the voltage across said storage means and said voltage corresponding to the magnitude of said one of said plurality of conditions for adjusting said known voltage to reduce substantially to zero and difference, individual circuits corresponding in number with the other of said plurality of conditions for development in each circuit of a voltage representative of the magnitude of each of said other conditions, and transfer means for applying said representative voltages to said storage means, each said circuit being electrically independent of the other during said application to vary said combination voltage in accordance with change in said selected relation between said magnitudes of conditions.

6. Apparatus for measuring a selected relation between the magnitudes of a plurality of conditions comprising a measuring circuit including in series electrostatic storage means, a source of voltage corresponding to the magnitude of one of said plurality of conditions, a source of known voltage and an unbalance detector, said unbalance detector including means operable in response to a difference between the known voltage and the combination of the voltage across said storage means and said voltage corresponding to the magnitude of said one of said plurality of conditions for adjusting said known voltage to reduce substantially to zero said difference, second electrostatic storage means, individual circuits corresponding in number with the other of said plurality of conditions for development in each circuit of a voltage representative of the magnitude of each of said other conditions, said second storage means including a transfer capacitor for each of said individual circuits, and means having transfer contacts for alternately and independently connecting each transfer capacitor to a corresponding one of said individual circuits, and then for connecting each of said capacitors in circuit with said first-named storage means.

7. Apparatus for measuring a selected relation between the magnitudes of a plurality of conditions comprising a measuring circuit including in series electrostatic storage means, a source of voltage corresponding to the magnitude of one of said plurality of conditions, a source of known voltage and an unbalance detector, said unbalance detector including means operable in response to a difference between the known voltage and a combination of the voltage across said storage means and said voltage corresponding to the magnitude of said one of said plurality of conditions for adjusting said known voltage to reduce substantially to zero said difference, second electrostatic storage means, individual circuits corresponding in number with the other of said plurality of conditions for development in each circuit of a voltage representative of the magnitude of each of said other conditions, and means having transfer contacts for alternately connecting said second storage means to said individual circuits, each said circuit being electrically independent of the other during said connection and then for connecting them to said first-named storage means.

8. A measuring system for measuring a selected relation between a plurality of unknown voltages representative of the magnitudes of a corresponding plurality of conditions comprising an electrical instrument adapted to adjust a reference voltage to equality with an input voltage, first capacitor means, second capacitor means, contact means connected to said second capacitor means to switch said second capacitor means from a source of one of said unknown voltages to said first capacitor means, thereby to charge said first capacitor means to a voltage proportional to said one of said unknown voltages and of the same polarity as said reference voltage, said input voltage being derived from an electrical network including said first capacitor means and a source of a second of said unknown voltages, and connections for applying said reference and said input voltages with like poling to said instrument whereupon said instrument adjusts said reference voltage to equality with said input voltage to provide a measure representative of the selected relation between the magnitudes of said plurality of conditions.

9. A measuring system according to claim 8 wherein said electrical network from which said input voltage is derived includes in series-circuit said first capacitor means and said source of a second of said unknown voltages.

10. A measuring system according to claim 8 wherein said electrical network from which said input voltage is derived includes in parallel-circuit said first capacitor means and said source of a second of said unknown voltages.

References Cited in the file of this patent

UNITED STATES PATENTS

| Number | Name | Date |
| --- | --- | --- |
| 2,285,482 | Wunsch | June 9, 1942 |
| 2,349,437 | Keeler | May 23, 1944 |
| 2,419,607 | Terry et al. | Apr. 29, 1947 |